(12) United States Patent
Lorono et al.

(10) Patent No.: US 9,465,894 B1
(45) Date of Patent: Oct. 11, 2016

(54) GENERATION OF SECTION VIEW CUTTING LINES WITH AUTOMATIC CONSTRAINTS

(71) Applicant: Dassault Systemes SolidWorks Corporation, Waltham, MA (US)

(72) Inventors: Matthew Lorono, Bolton, MA (US); Nikhil Kulkarni, Acton, MA (US); Thomas M. Spine, Londonderry, NH (US)

(73) Assignee: Dassault Systemes Solidworks Corporation, Waltham, MA (US)

( * ) Notice: Subject to any disclaimer, the term of this patent is extended or adjusted under 35 U.S.C. 154(b) by 507 days.

(21) Appl. No.: 13/761,080

(22) Filed: Feb. 6, 2013

Related U.S. Application Data

(60) Provisional application No. 61/597,479, filed on Feb. 10, 2012, provisional application No. 61/597,678, filed on Feb. 10, 2012.

(51) Int. Cl.
*G06F 17/50* (2006.01)
(52) U.S. Cl.
CPC .................................... *G06F 17/50* (2013.01)
(58) Field of Classification Search
CPC ............... G06F 17/50; G06F 17/5004; G06F 17/5018; G06F 17/5095; G06T 19/00
USPC ............................................................. 703/1
See application file for complete search history.

(56) References Cited

U.S. PATENT DOCUMENTS

2011/0185272 A1 7/2011 Rajkumar

OTHER PUBLICATIONS

Lemon et al. "Building solid models from boreholes and user-defined cross-sections." 2003. Computers & Geosciences 29 (2003) 547-555.*

* cited by examiner

*Primary Examiner* — Saif Alhija
(74) *Attorney, Agent, or Firm* — Hamilton, Brook, Smith & Reynolds, P.C.

(57) ABSTRACT

Creating a section view of a computer-aided design model includes creating a cutting line to apply to the computer-aided design model by at least one cut operation, constraining the cutting line by selecting a constraining point on the computer-aided design model or first inferring a geometric candidate to constrain the initial cutting line, and enhancing the cutting line by automatically adding an enhancement according to an enhancement type and adjusting the enhancement via a cursor-controlled device according to a set of rules.

22 Claims, 8 Drawing Sheets

GENERATION OF SECTION VIEW CUTTING LINES WITH AUTOMATIC CONSTRAINTS

RELATED APPLICATIONS

This application claims the benefit of U.S. Provisional Application No. 61/597,479, filed on Feb. 10, 2012 and U.S. Provisional Application No. 61/597,678, filed on Feb. 10, 2012.

The entire teachings of the above application(s) are incorporated herein by reference.

BACKGROUND OF THE INVENTION

Computer-aided design (CAD) software allows a user to construct and manipulate complex three-dimensional (3D) models. A number of different modeling techniques can be used to create a 3D model. These techniques include solid modeling, wire-frame modeling, and surface modeling. Solid modeling techniques provide for topological 3D models, where the 3D model is a collection of interconnected topological entities (e.g., vertices, edges, and faces). The topological entities have corresponding supporting geometrical entities (e.g., points, trimmed curves, and trimmed surfaces). The trimmed surfaces correspond to the topological faces bounded by the edges. Wire-frame modeling techniques, on the other hand, can be used to represent a model as a collection of simple 3D lines, whereas surface modeling can be used to represent a model as a collection of exterior surfaces. CAD systems may combine these and other modeling techniques, such as parametric modeling techniques. Parametric modeling techniques can be used to define various parameters for different features and components of a model, and to define relationships between those features and components based on relationships between the various parameters.

CAD systems may also support two-dimensional (2D) objects that are 2D representations of 3D objects. Two- and three-dimensional objects are useful during different stages of a design process. Three-dimensional representations of a model are commonly used to visualize a model in a physical context because the designer can manipulate the model in 3D space and can visualize the model from any conceivable viewpoint. Two-dimensional representations of a model are commonly used to prepare and formally document the design of a model.

A design engineer is a typical user of a 3D CAD system. The design engineer designs physical and aesthetic aspects of 3D models, and is skilled in 3D modeling techniques. The design engineer creates parts and may assemble the parts into a subassembly. A subassembly may also consist of other subassemblies. An assembly is designed using parts and subassemblies. Parts and subassemblies are hereinafter collectively referred to as components.

A design engineer or a manufacturing engineer may wish to view the internals of a CAD model. To do so, a section view of the model is constructed. A section view is a representation of a cross-section of the model and created by executing a Boolean cut operation on the model, essentially slicing through the model at locations defined by one or more planes. Defining and positioning the planes are a precursor to executing a Boolean cut operation.

Creating a cutting plane for a section view often requires a design engineer to employ sketch tools and techniques to draw a 2D shape that represents a cutting pattern. The design engineer thus needs to be trained how to use sketching tools and apply sketching techniques. In addition, sketching may require a significant amount of mouse travel and a significant number of mouse clicks to accomplish a task. Solid-Works® 2012 software, available from Dassault Systémes SolidWorks Corporation of Waltham, Mass., provides two section tools for creating a sketch in order to create a section view; thus, design engineers may need to learn how to use two different section tools, and also two different work flows.

Sketching a cutting pattern also requires the creation of geometric constraints, which typically involves selecting geometry in the sketch, selecting geometry in the 3D model, and selecting the type of constraint to apply (e.g., coincident or concentric). These tasks are repeated for each constraint to be added. Moreover, some constraints require the addition of one or more reference points that act as links between the sketch geometry and the 3D model geometry, each constrained to the reference point separately, forcing the sketch geometry to be constrained via an indirect connection to the 3D model geometry.

In general, state-of-the-art computerized modeling systems require the design engineer to constrain a line by the line's endpoints. For example, to constrain a line to the center of a hole so that the line passes through the center, the line is constructed as two lines, each having two endpoints. This is necessary to constrain the second endpoint of the first line and the first endpoint of the second line to the center of the hole because the line cannot be constrained at any point along the line.

Time-saving advantages can be obtained by not requiring a design engineer to create a sketch in order to create a section view. The overall goal of creating a section view is hindered by having to first create a sketch of the cutting pattern, during which time one or more points need to be manually constrained by the user, and projecting the sketch onto the model.

The length of time taken to generate a section view is a function of a number of factors, including how experienced the design engineer is with creating sketches, the number of constraints that need to be established, the number of different steps in the process (which may be determined by the number of mouse clicks), and the complexity of the desired section view.

To increase productivity, current state-of-the-art CAD systems would benefit from a system and method for providing a more intuitive work flow for creating a section view directly, without first having to create a sketch to help specify a desired section view. Providing a means to intuitively create a section view of a model and thereby reduce the amount of time to create the section view would enhance the capabilities of a computerized modeling system.

SUMMARY OF THE INVENTION

In general, in one aspect, the invention features a computer-implemented method for creating a section view of a computer-aided design model. The method includes creating an initial cutting line formed of one or more line segments to apply to the model by at least one cut operation, the initial cutting line having a predetermined path selected from a computer user interface. The initial cutting line is constrained by selecting a constraining point on the model or first inferring a geometric candidate on the model to constrain the initial cutting line. The initial cutting line may then be enhanced by automatically adding an enhancement (having at least one line segment) to the initial cutting line according to an enhancement type and adjusting the shape of the enhancement via a cursor-controlled device according to a set of rules.

Other aspects of the present invention include constraining the initial cutting line at any point on the initial cutting line, interactively tracking a point on the initial cutting line or the enhanced cutting line based on a cursor movement, and modifying the size or the position of a line segment belonging to the initial cutting line or the enhancement with respect to the location of the point.

An additional enhancement may automatically be added to the enhanced initial cutting line according to a set of rules. The set of rules may include adding the additional enhancement toward the direction of an outer boundary of the model, and/or only to an outer segment of the enhanced initial cutting line.

Implementations may also include visually indicating the geometric candidate, having the predetermined path be horizontal, vertical, inclined, or bent, and/or having the enhancement type be an arc offset, a single offset, or a notch offset.

The details of one or more embodiments of the invention are set forth in the accompanying drawings and the description that follows. Other features, objects, and advantages of the invention will be apparent from the description and drawings, and from the claims.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The present invention enables a design engineer using a computer-aided design (CAD) system to intuitively create a section view of a CAD model. To accomplish this, the present invention creates a basic cutting line and enables a design engineer to customize the cutting line to include additional line segments. (Hence, the term cutting line used herein also refers to a multi-line segment shape that specifies a path in which to slice through a model.) The cutting line is then used to uniquely slice through the CAD model. The cutting line may be viewed conceptually as infinite. Thus, the cutting line does not have readily identifiable endpoints. Importantly, the cutting line may be constrained at any point rather than only at an endpoint. To aid the design engineer in constraining the cutting line, the present invention infers and indicates various locations where the design engineer may want to constrain the cutting line while the cutting line is being generated.

Figure 1:
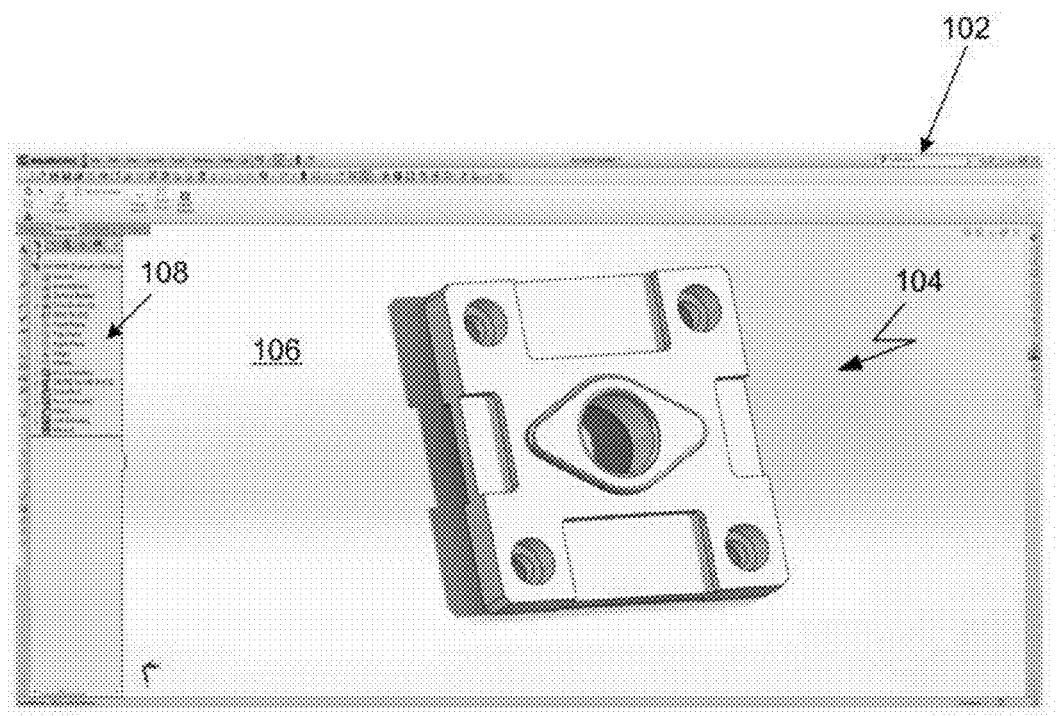
FIG. 1 is an illustration of a computer-generated model displayed in a three-dimensional window.

Referring now to FIG. 1, a window 102 displayed on a computer monitor is shown. The window 102 is generated by modeling software executed by a computerized modeling system, an example of which is later shown with reference to FIG. 8. The window 102 is a conventional computer-generated window that can be programmed by one of ordinary skill in the art using conventional, commercially available, software programming tools, such as those available from Microsoft Corporation of Redmond, Wash.

A computer-generated 3D model 104 is displayed within a modeling portion 106 of the window 102. The surfaces of the 3D model 104 can be displayed, or the 3D model 104 can be displayed using solid lines and dashed lines to show visible edges and hidden edges, respectively, of the 3D model. Implementations also may include other window areas, such as a FeatureManager® window panel 108 in which the structure of a component, an assembly, or a drawing is listed to help the design engineer visualize and manipulate the 3D model 104, as well as components of the 3D model 104.

Figure 2:
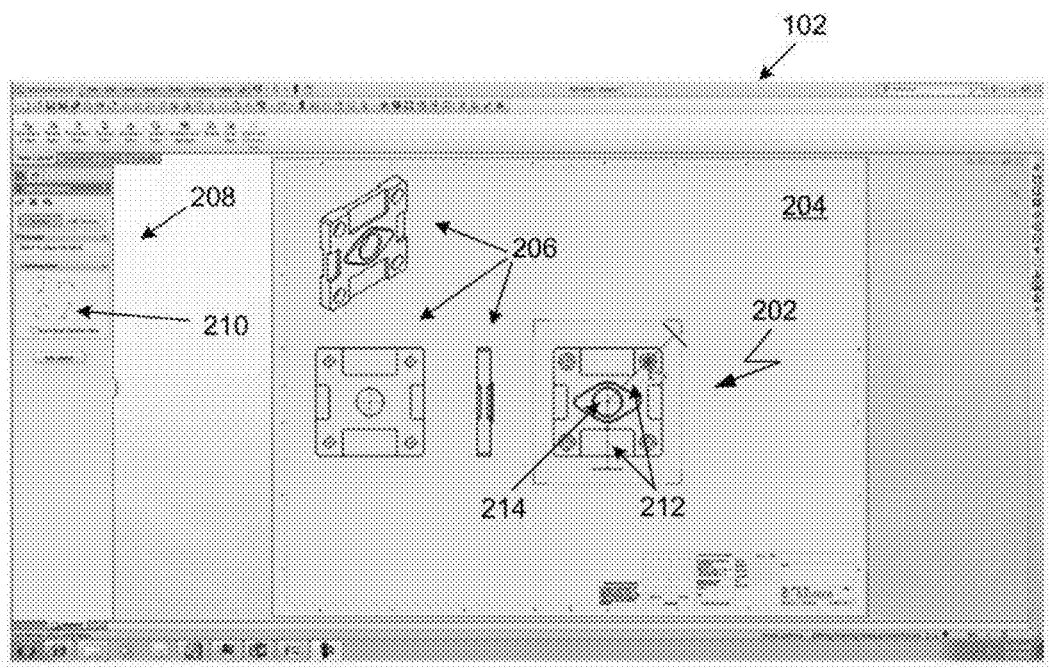
FIG. 2 is an illustration of a computer-generated model displayed in a two-dimensional drawing.

FIG. 2 shows a front view 202 of the 3D model 104 in a two-dimensional (2D) drawing 204. Other views 206 are also shown in the drawing 204. A menu palette 208 enables a design engineer to select a cutting line path by choosing an icon depicting initial cutting line paths. By way of non-limiting example, menu palette 208 depicts horizontal, vertical, inclined, and bent images of a line that when selected create a horizontal, vertical, inclined, and bent initial cutting line, respectively. FIG. 2 shows the drawing view after the design engineer has selected the bent line icon 210 as illustrated by the appearance of a bent cutting line 212 in the front view 202. As mentioned, a cutting line is conceptually infinite, and in FIG. 2 the cutting line 212 is drawn such that the ends of the cutting line 212 extend beyond the boundaries of the 2D depiction of the 3D model 104.

Typically, a design engineer uses a mouse (cursor-controlled) device to select features and components of a CAD model, as well as to select options from menus and to indicate locations. The location corresponding to the mouse in the window 102 may be indicated by a pointer (cursor). An initial cutting line when selected attaches to the cursor location and the design engineer may then drag the cutting line into a 2D view (or alternatively over a 3D model in a 3D modeling environment). The design engineer specifies a location to place the cutting line by pressing a mouse button, which sends data to the computerized modeling system indicating the location of the cursor, and thus, the location of the cutting line.

Figure 3A:
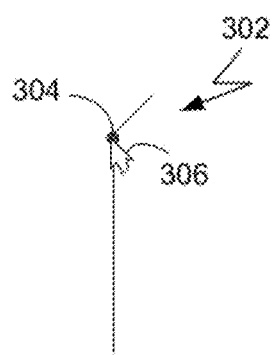
FIGS. 3A-3C are illustrations of a bend cutting line.
Figure 3B:
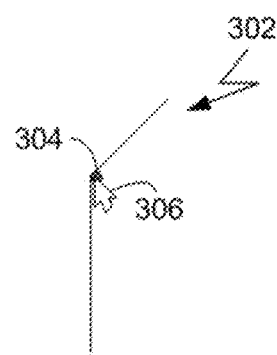
Figure 3C:
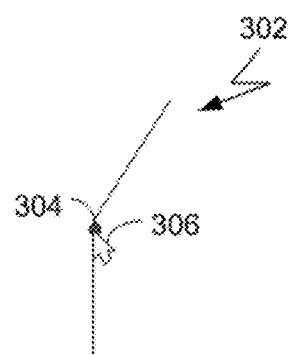

Referring now to FIG. 3, in the case of a bent cutting line 302, the design engineer can control the length of the bent cutting line segments by controlling the bend point 304 at which the line segments meet. The present invention enables the design engineer to move a cursor 306 along the bent cutting line using a cursor-controlled pointing device. The location of the bend point 304 coincides with the location of the cursor 306. To illustrate, FIGS. 3a, 3b, and 3c in progression show the bend point 304 moving downward as the cursor 306 moves downward along the lower segment of cutting line 302. In addition, the present invention allows the cursor 306 to move along any initial or enhanced cutting line, using the cursor position to modify the cutting line (also referred to herein as enhancing the cutting line). This feature allows potentially any point on the cutting line to be used when interactively enhancing a cutting line because the position of the enhancement on the cutting line and the shape of the enhancement are easily adjusted (according to rules, which will later be discussed). In general, the present invention tracks a point on the cutting line based on cursor movement thereby giving valuable graphical user feedback needed to intuitively develop the cutting line.

Referring back to FIG. 2, the cutting line 212 is constrained by a center of a hole 214. Prior to the constraint being established, the present invention inferred that the center of hole 214 could act to constrain cutting line 212. The present invention notifies the design engineer of such an inference by highlighting the hole 214 when the cutting line 212 is dragged within a prescribed proximity to the hole 214 (or center thereof). Other embodiments may highlight an object by different means, such as causing the object to pulsate or flash on and off, by way of non-limiting example.

Figure 4:
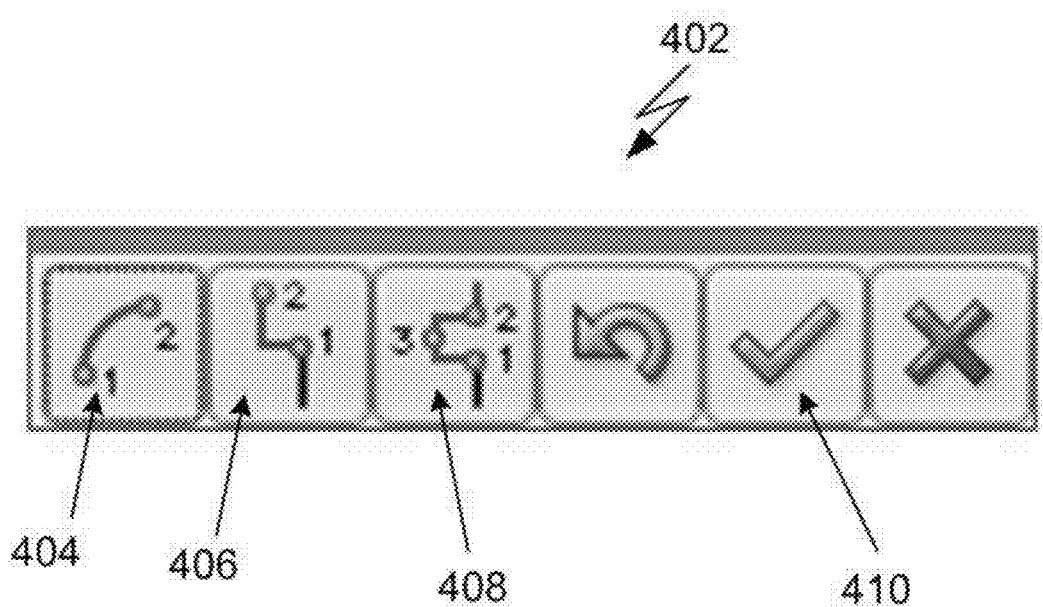
FIG. 4 is an illustration of a set of user interface buttons.

Referring now to FIG. 4, a user interface (UI) is shown, from which the design engineer may choose types of enhancements to make to the initial cutting line 212. A set of UI buttons 402 is presented to the design engineer, from which a type of enhancement may be selected. The set of buttons 402 enable an arc offset, a single offset, and a notch offset enhancements to be added to the cutting line 212 by selecting the first 404, second 406, and third 408 buttons, respectively, from the set of buttons 402. The arc offset, single offset, and notch offset modifications represent international standards for drawings, such as ISO and ASME; however, arc offset, single offset, and notch offset modifications are non-limiting examples of modifications the present invention can employ in other embodiments. Further, the present invention allows the design engineer to create customized modification styles by using XML files to extend the types of modifications, as disclosed by Parapura T. Rajkumar in U.S. Patent Application 20110185272.

Figure 5A:
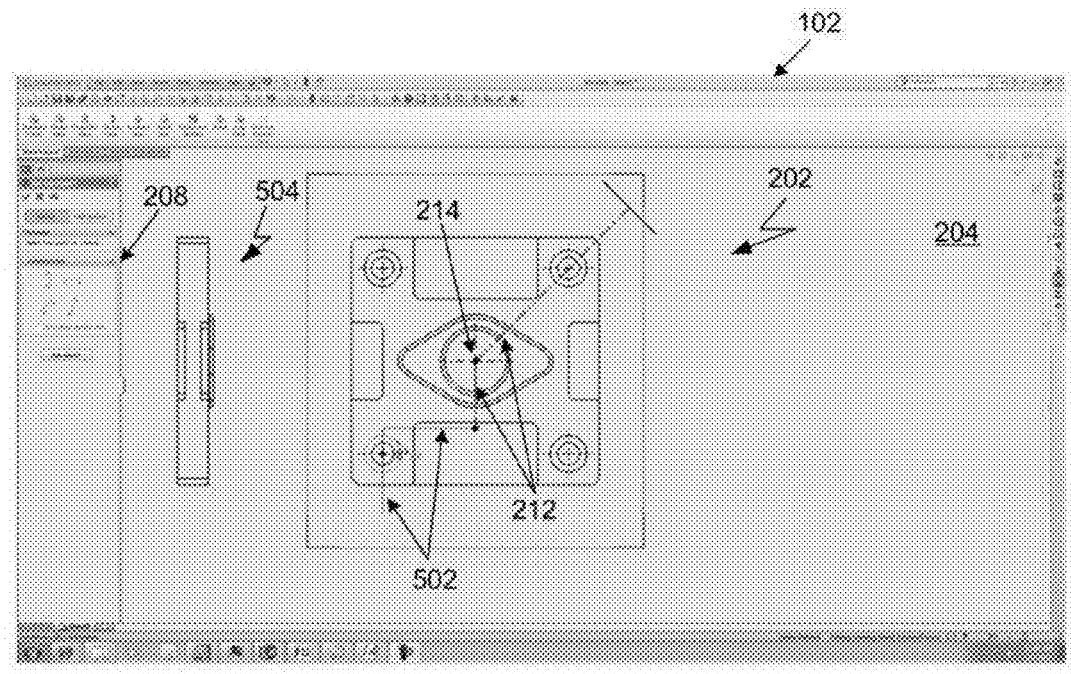
FIG. 5a is an illustration of a computer-generated model displayed in a two-dimensional drawing.
Figure 5B:
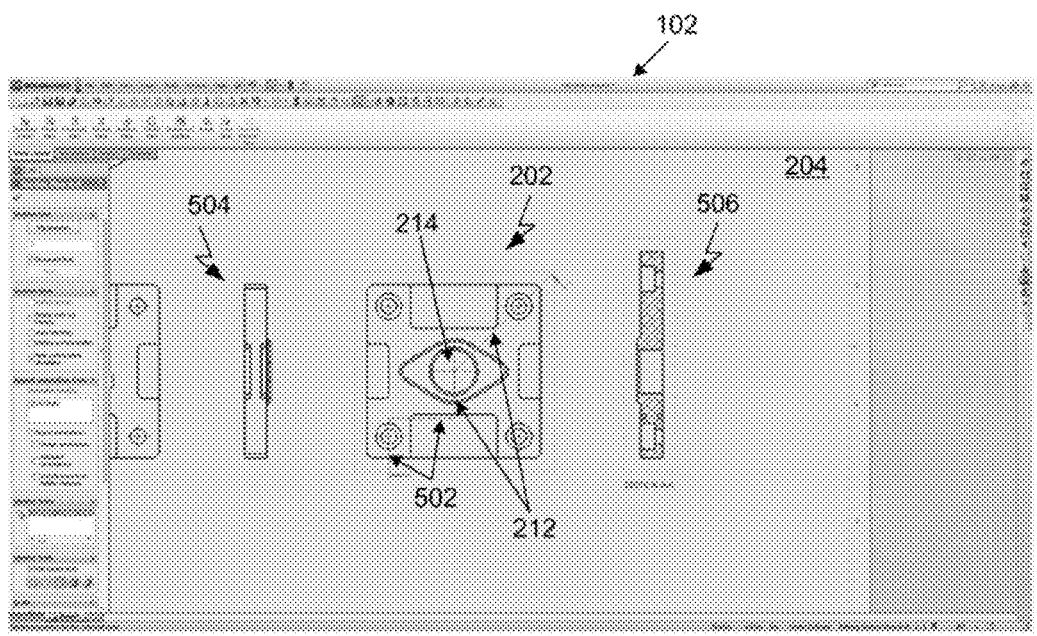
FIG. 5b is an illustration of a computer-generated model displayed in a two-dimensional drawing.
Figure 6:
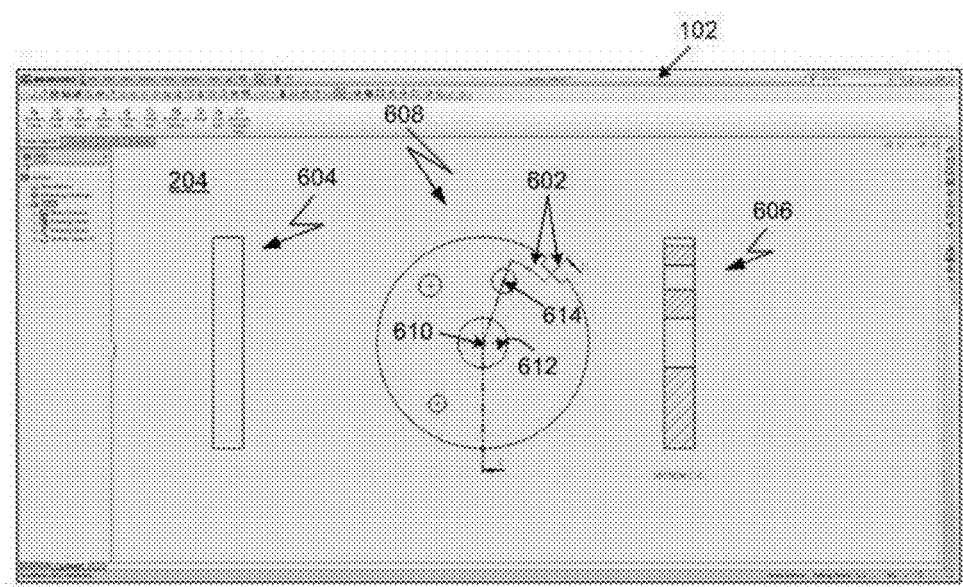
FIG. 6 is an illustration of a computer-generated model displayed in a two-dimensional drawing.

FIG. 5a, 5b, and FIG. 6 show examples of enhancements to an initial cutting line. FIG. 5a and FIG. 5b show a notch offset 502; whereas, FIG. 6 shows an arc offset 602, which enhanced an initial cutting line initially constrained at the center 610 of a large hole 612. FIG. 5a, 5b, and FIG. 6 also show the resulting section views 504, 506, 604, and 606. Resulting section views are displayed on the left and right side of the drawing views 202, 608 from which the section view was constructed. In an embodiment, as the design engineer moves the cursor from the left to the right side of the drawing views 202, 608, the cross-section from one piece of the resulting section is displayed on the left side of the drawing views 202, 608 and the cross-section from the other piece of the resulting section is displayed on the right of the drawing views 202, 608, respectively. Automatically placing the resulting views in this manner not only allows the design engineer to determine which side of the drawing views 202, 608 to place the resulting section views 504, 506, 604, 606, but also which side of the section cut to render in a new drawing view depicting the section.

Figure 7:
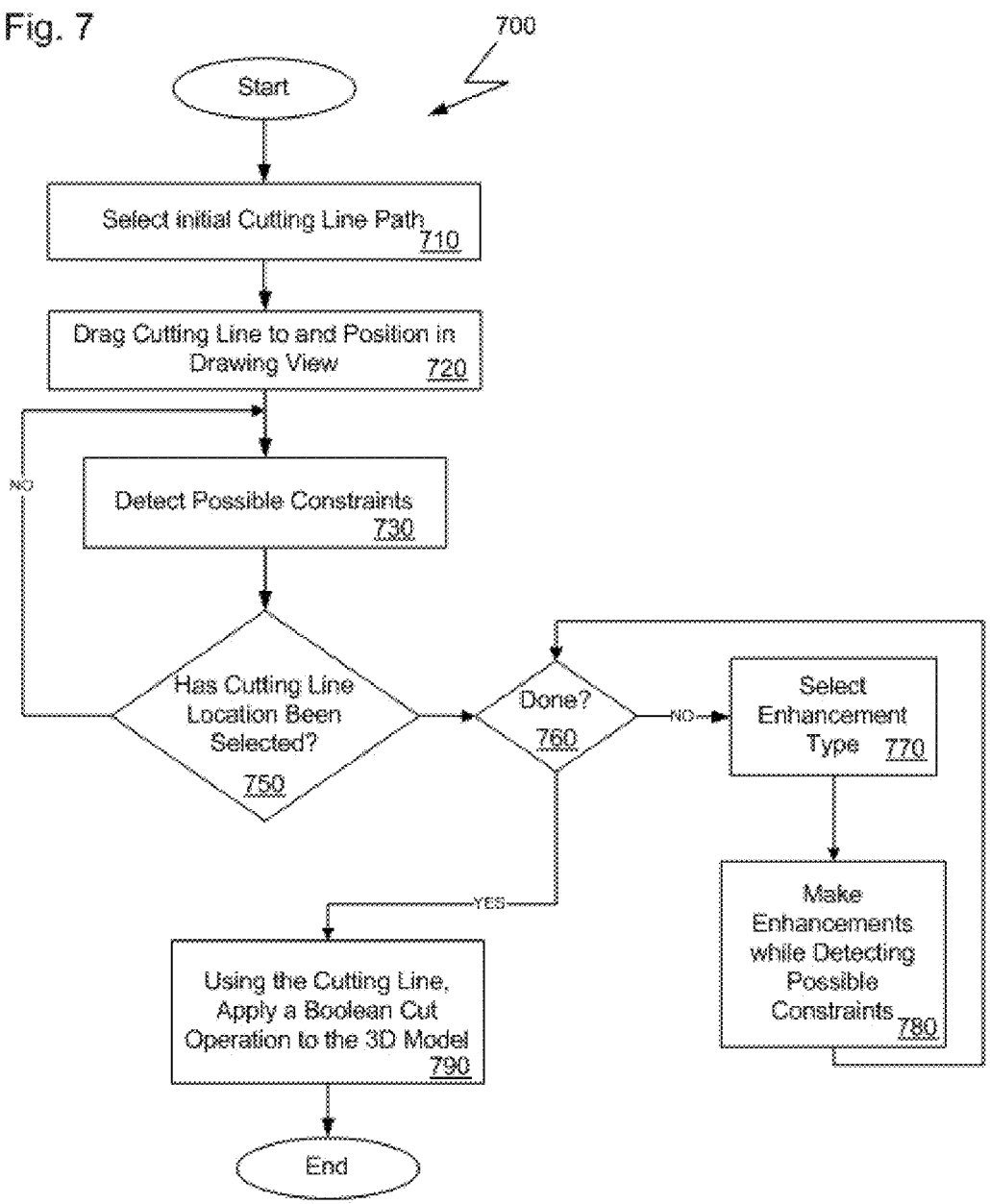
FIG. 7 is a flowchart of a process for generating section lines according to an embodiment of the present invention.

FIG. 7 illustrates a process 700 that constructs a cutting line and section view according to an embodiment of the present invention. Throughout the process 700, the present invention aids and guides the design engineer in constructing a viable cut through a model via a visualization tool that indicates constraint candidates and enables the design engineer to interactively investigate different cutting line paths. The present invention begins construction of a section view by allowing the design engineer to select a simple path for an initial cutting line (step 710). By way of non-limiting example, cutting line paths include vertical, horizontal, inclined, and bent as shown in the menu palette 208 in FIG. 2. Using a pointing device, the design engineer then drags and places the cutting line in a 2D drawing over a 2D view of a 3D model (step 720). Alternatively, the cutting line may be displayed with the 3D model 104 (shown in FIG. 1) in the modeling portion 106 of the window 102, and the cutting line may be represented in three dimensions either as a series of lines or planes that extend from the line.

In an embodiment, the present invention may determine which drawing view in a 2D drawing should be used to create the section (i.e., the active view). Embodiments may determine which drawing view is closest and that view becomes the active view, which view is most appropriate to become the active view, or a combination thereof. For example, an oblique view or another section view may not be considered appropriate and these views would not be included when computing which drawing view is closest. The present invention then highlights the active view (e.g., by highlighting a boundary of the view) to direct the design engineer's attention to the most appropriate view for constructing the cutting line.

In the next step, geometry that may constrain the cutting line are automatically inferred (step 730). For example, if a hole is near the position of the cursor (to which the cutting line is attached), the center of the hole may be considered a possible constraint. A part or assembly may have several holes, in which case, the hole closest to the cursor is indicated as a possible constraint, or perhaps a hole that is closest and in the direction of travel of the cursor is indicated as a possible constraint. Such an indication may be that the geometry is highlighted, or in the case of a center of a hole, the geometry corresponding to the edges of the hole as well as the center of the hole are highlighted. Other geometry that may be inferred as constraint candidates are straight, arced, circular, and silhouette (e.g., cylindrical) edges that appear in the drawing view as a line or series of continuous lines, as well as vertices represented as points at the end of a line that represents an edge. The present invention can also determine a center point of a circle, an arc, and a slot.

To automatically infer a constraint, a process calculates an area surrounding the cursor in which to detect constraint candidates. Additionally, the inference process may also calculate the cursor's direction of travel and expand the area into a conical area extending in the direction of the cursor path thereby considering constraint candidates only in the direction of travel. The process then attempts to detect geometry corresponding to an edge or a vertex that passes through an area surrounding or emanating from the cursor that, and if such geometry is detected, the process may infer that the geometry is a constraint candidate.

Process 700 continues to detect (or attempt to detect) constraint candidates until a mouse-button-down event is detected indicating the selection of the cutting line location (step 750). Upon detecting the mouse-button-down event, process 700 causes the cutting line to snap to the highlighted constraint. Then, the present invention automatically creates an appropriate constraint between the cutting line and the geometry beneath the cursor (e.g., a coincident constraint between the cutting line and a point on a surface of a part), or between the cutting line and a parameter of a geometric entity beneath the cursor (e.g., a concentric constraint between the cutting line and the center of a circle). However, if no highlighted constraint exists, the present invention creates a point beneath the cursor point and automatically constrains the cutting line at that point.

After the initial cutting line is constrained to a point, another constraint may be added to a segment of the cutting line, including an alignment constraint (e.g., by establishing a vertical or perpendicular constraint). However, the cutting line may need to be repositioned first. To facilitate repositioning, the ends of the cutting line have unconstrained degrees of freedom such that the design engineer can point at then rotate the cutting line about the center of the cutting line, or in the case of a bend-shaped cutting line, rotate a bend segment about the bend point, thereby repositioning the cutting line.

The design engineer then indicates whether he or she has completed the construction of a cutting line or wishes to enhance the cutting line (step 760). The design engineer may press the check button 410 (shown with reference to FIG. 4) sending a signal that he or she is ready to have the cut operation performed on the model (step 790). Alternatively, the design engineer may press a UI button 402 corresponding to a type of enhancement as described with reference to FIG. 4 (step 770). As previously discussed, enhancement types include arc offset, single offset, and notch offset types. Once an enhancement type is selected, an enhancement of that type is immediately added to the cutting line ready to be sized and have the enhancement location further specified. Enhancements may then be made while constraints are detected (or not) (step 780), as was discussed with reference to step 730.

For a single offset and a notch offset, the design engineer also has control over the length of the offset line segments by grabbing any of the offset line segments at any point and interactively pulling and pushing the segments using a mouse-controlled cursor. This in turn may also cause the lengths of other segments in the cutting line to react according to rules, which will be discussed.

For an arc offset, the arc begins at a point on the cutting line closest to the cursor location. The radius of the arc is measured from the point that first constrained the initial cutting line being enhanced (e.g., the center 610 of a large hole 612 shown in FIG. 6). However, embodiments allow the design engineer to select other points, such as the last point on the cutting line that was constrained (e.g., point 614 in FIG. 6). The arc ends at a point determined by the current position of the mouse-controlled cursor, which is at the cursor location if the cursor is positioned on the arc or at a point where the cutting line extends toward the model boundary perpendicular to a tangent of the arc at the endpoint. The endpoint is dynamically updated as the design engineer is interactively making adjustments to and finalizing the enhancement.

When the design engineer indicates that he or she is finished making modifications (step 760), for example, by pressing the check button 410 (shown with reference to FIG. 4), process 700 creates the cross-section of the model. To create the cross-section, a Boolean cut operation is applied to the 3D model using the cutting line (step 790). The cutting line generally specifies one or more planes that are operands to the cut operation. The result is that the model is sliced in a manner consistent with the cutting line path. Furthermore, the present invention extends the cutting planes beyond the boundaries of the model to ensure that the model is completely cut through. However, in an embodiment, if the design engineer wishes to create a partial cut (or to modify the cutting path in any way), the design engineer may edit the final cutting line as he or she may do with any sketch, once process 700 completes, for the cutting line path is a sketch in the computerized modeling system.

While constructing a cutting line, the present invention adheres to certain rules. The rules are based on empirical research with regards to industry standards of and requirements for engineering and architectural drawings. The rules also help avoid errors that may occur in the prior art. One such rule is that a modification to a cutting line is always constructed toward the direction of the outer boundaries of a model as determined by calculating a vector from a constraining point to the outer boundary of the model. A second rule and a third rule are that an arc offset and a single offset to a cutting line can only be applied to outer segments of the cutting line, never to inner segments of the cutting line, which would create a self-intersecting or non-continuous cutting line. Another rule for creating a single offset is that line segments for the single offset are always perpendicular. Rules for creating a notch offset ensure that a notch offset always has three perpendicular edges and that a notch segment does not have one point on one segment of a cutting line and a second point on another segment of the cutting line, which would not open up the cutting line.

These rules are enforced while a design engineer is interactively creating the enhancements to a cutting line and receiving visual feedback with regards to the positioning and constraining of the initial and enhanced cutting line. Enforcing the rules during the interactive process is another way that the present invention enables the design engineer to quickly and intuitively create a cutting line path.

Figure 8:
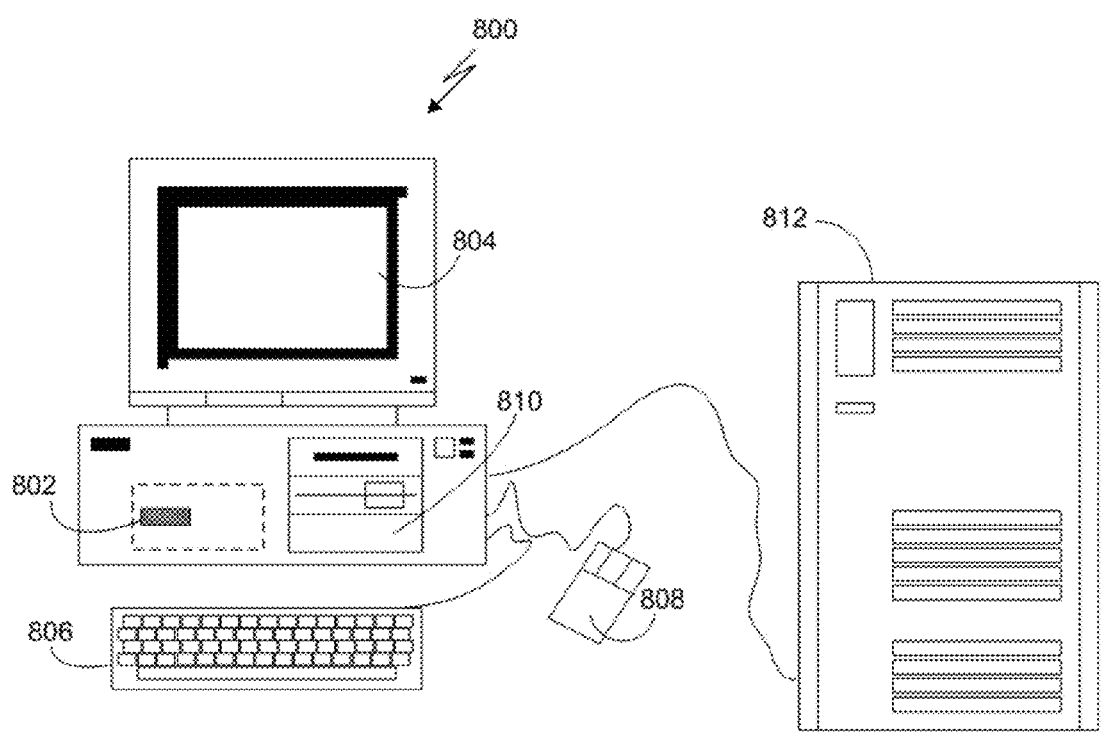
FIG. 8 is a diagram of a computer system embodying the present invention.

Referring now to FIG. 8, a computerized modeling system 800 is shown and includes a CPU 802, a computer monitor 804, a keyboard input device 806, a mouse input device 808, and a storage device 810. The CPU 802, computer monitor 804, keyboard 806, mouse 808, and storage device 810 can include commonly available computer hardware devices. For example, the CPU 802 can include a Pentium-based processor. The mouse 808 may have conventional left and right buttons that the user may press to issue a command to a software program being executed by the CPU 802. As an alternative or in addition to the mouse 808, the computerized modeling system 800 can include a pointing device such as a trackball, touch-sensitive pad, or pointing device and buttons built into the keyboard 806. Those of ordinary skill in the art appreciate that the same results described herein with reference to a mouse device can be achieved using another available pointing device. Other appropriate computer hardware platforms are suitable as will become apparent from the discussion that follows. Such computer hardware platforms are preferably capable of operating the Microsoft Windows XP, Windows Vista, Windows 2007, UNIX, Linux, or MAC OS operating systems.

Additional computer processing units and hardware devices (e.g., rapid prototyping, video, and printer devices) may be included in the computerized modeling system 800. Furthermore, the computerized modeling system 800 may include network hardware and software thereby enabling communication to a hardware platform 812, and facilitating communication between numerous computer systems that include a CPU and a storage system, among other computer components.

Computer-aided modeling software may be stored on the storage device 810 and loaded into and executed by the CPU 802. The modeling software allows a user to create and modify a 3D model and implements aspects of the invention described herein. The CPU 802 uses the computer monitor 804 to display a 3D model and other aspects thereof as described. Using the keyboard 806 and the mouse 808, the user can enter and modify data associated with the 3D model. The CPU 802 accepts and processes input from the keyboard 806 and mouse 808. The CPU 802 processes the input along with the data associated with the 3D model and makes corresponding and appropriate changes to that which is displayed on the computer monitor 804 as commanded by the modeling software. In one embodiment, the modeling software is based on a solid modeling system that may be used to construct a 3D model consisting of one or more solid and surface bodies.

The invention may be implemented in digital electronic circuitry, or in computer hardware, firmware, software, or in combinations thereof. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; in any case, the language may be a compiled or interpreted language. Suitable processors include, by way of non-limiting example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, custom-designed ASICs (application-specific integrated circuits).

Advantages of the present invention include that no longer are geometric reference planes, pre-selection of model geometry in the drawing view, pre-selection of a drawing view, nor the creation of and direct interaction with sketch elements required of the design engineer for creating a section view of a model. Further, errors that occur when creating a section are avoided by adhering to a set of rules. Other advantages include utilizing fast and intuitive methods to create a cutting line while constraints to the cutting line are automatically inferred and applied. Moreover, the present invention tracks a point on the cutting line based on cursor movement, which gives valuable graphical user feedback needed to intuitively develop the cutting line. A visualization tool indicates constraint candidates, which enables a design engineer to explore various cutting paths through the model. These advantages remove the need for a design engineer to be skilled with sketching techniques, which saves considerable time and effort. Further advantages include the reduction of the number of mouse clicks to accomplish a task as well as reduced mouse movement. Moreover, as the complexity of the cutting line increases, the efficiency in which a design engineer constructs the cutting line also increases.

A number of embodiments of the present invention have been described. Nevertheless, it will be understood that various modifications may be made without departing from the spirit and scope of the invention. For example, implementations may change the order in which operations are performed. Furthermore, depending on the needs of an implementation, particular operations described herein may be implemented as a combined operation, eliminated, added to, or otherwise rearranged. Moreover, although a design engineer usually creates a section view while working in a 2D drawing environment, section views may be created in a 3D modeling environment, and embodiments described herein also may be implemented in a 3D environment.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims. Accordingly, other embodiments are within the scope of the following claims.

What is claimed is:

1. A computer-implemented method for creating a section view of a computer-aided design model, the method comprising:
   in response to user deployment of a cut operation, implementing by a computer:
      a) creating an initial cutting line formed of one or more line segments to apply to the computer-aided design model and resulting in a section view of the computer-aided design model, wherein the computer forms the initial cutting line from a predetermined path selected by a user from a computer user interface;
      b) constraining the initial cutting line by one of: (1) detecting a user-selected constraining point on the computer-aided design model, and (2) prior to a constraint being established, the computer making an inference based on geometry of the computer-aided design model that a geometric entity on the computer-aided design model could be used to constrain the initial cutting line, wherein said making the inference by the computer comprises: (i) detecting with respect to geometry of the geometric entity at least one of cursor activity and proximity of a cursor to the geometric entity, and (ii) determining possible use of the geometric entity as a constraint when the at least one of cursor activity and proximity of the cursor is within a predefined closeness to the geometric entity, and said making the inference resulting in the geometric entity serving as a user-selectable inferred constraint candidate; and
      c) enhancing the initial cutting line, wherein enhancing comprises:
         automatically adding an enhancement to the initial cutting line according to an enhancement type and resulting in an enhanced cutting line, wherein the enhancement forms at least one line segment in the enhanced cutting line; and
         adjusting a shape of the enhancement via a cursor-controlled device according to a set of rules.

2. The computer-implemented method of claim 1, wherein the initial cutting line may be constrained at any point on the initial cutting line.

3. The computer-implemented method of claim 1, further comprising interactively tracking a point on one of the initial cutting line and the enhanced cutting line based on a cursor movement.

4. The computer-implemented method of claim 3, further comprising modifying one of a size and a position of a line segment of one of the initial cutting line and the enhancement according to a location of the point.

5. The computer-implemented method of claim 1, further comprising displaying an indication of the geometric entity as the user-selectable inferred constraint candidate.

6. The computer-implemented method of claim 1, wherein constraining the initial cutting line by making an inference comprises calculating an area surrounding a cursor in which to detect the geometric entity to serve as the inferred constraint candidate.

7. The computer-implemented method of claim 1, wherein constraining the initial cutting line by making an inference comprises inferring the geometric entity by considering direction of travel of a cursor.

8. The computer-implemented method of claim 1, wherein the predetermined path is one of horizontal, vertical, inclined, and bent.

9. The computer-implemented method of claim 1, wherein the enhancement type is one of arc offset, single offset, and notch offset.

10. The computer-implemented method of claim 1, wherein the computer-aided design model is depicted as at least one of a two-dimensional representation (2D) of a three-dimensional (3D) model shown in a 2D drawing view of a drawing and a 3D model in a 3D model portion of the user interface window.

11. A non-transitory machine-readable storage medium comprising instructions for causing a computer to:
create an initial cutting line formed of one or more line segments to apply to a computer-aided design model by at least one cut operation to create a section view of the computer-aided design model, wherein the initial cutting line takes form according to an initial cutting path selected by a user from a computer user interface;
constrain the initial cutting line by one of: (i) detecting user selection of a constraining point on the computer-aided design model, and (ii) prior to a constraint being established, making an inference based on geometry of the computer-aided design model that a geometric entity on the computer-aided design model could be used to constrain the initial cutting line then detecting user selection of the geometric entity as a constraint candidate, said computer making the inference by: (a) detecting with respect to geometry of the geometric entity at least one of cursor activity and proximity of the cursor to the geometric entity, and (b) determining possible use of the geometric entity as a constraint when the at least one of cursor activity and proximity of the cursor is within a predefined closeness to the geometric entity; and
enhance the initial cutting line by automatically adding an enhancement to the initial cutting line according to an enhancement type and interactively manipulating the enhancement according to a set of enhancement rules.

12. The machine-readable storage medium of claim 11, wherein the initial cutting line may be constrained at any point on the initial cutting line.

13. The machine-readable storage medium of claim 11, further comprising instructions for causing a computer to interactively track a point on one of the initial cutting line and the enhanced cutting line based on a cursor movement.

14. The machine-readable storage medium of claim 11, further comprising instructions for causing a computer to modify one of a size and a position of a line segment of one of the initial cutting line and the enhancement according to a location of the point.

15. The machine-readable storage medium of claim 11, further comprising instructions for causing a computer to automatically add an additional enhancement to the enhanced initial cutting line, wherein:
a set of rules applies to adding the additional enhancement; and
the set of rules comprises at least one of adding the additional enhancement toward the direction of an outer boundary of the computer-aided design model and adding the additional enhancement only to an outer line segment of the enhanced initial cutting line relative to the outer boundary.

16. The machine-readable storage medium of claim 11, wherein the enhancement type is one of arc offset, single offset, and notch offset.

17. The machine-readable storage medium of claim 11, further comprising instructions for causing a computer to display an indication of the geometric entity as a user-selectable inferred constraint candidate.

18. A computer-aided design system comprising:
a processor operatively coupled to a data storage system, the data storage system storing a three-dimensional model representing a real-world object; and
a data storage memory operatively coupled to the processor and comprising instructions to configure the processor to:
create an initial cutting line formed of one or more line segments to apply to the three-dimensional design model by at least one cut operation to create a section view of the three-dimensional model, wherein an initial path of the initial cutting line is user-selected from a computer user interface;
constrain the initial cutting line by one of: (i) detecting user selection of a constraining point on the computer-aided design model, and (ii) prior to a constraint being established, making an inference based on geometry of the computer-aided design model that a geometric entity on the computer-aided design model could be used to constrain the initial cutting line then detecting user selection of the geometric entity as a constraint, the processor making the inference by: (a) detecting with respect to geometry of the geometric entity at least one of cursor activity and proximity of the cursor to the geometric entity, and (b) determining possible use of the geometric entity as a constraint when the at least one of cursor activity and proximity of the cursor is within a predefined closeness to the geometric entity; and
enhance the initial cutting line by automatically adding an enhancement according to an enhancement type and interactively manipulating the enhancement according to a set of enhancement rules.

19. The computer-aided design system method of claim 18, wherein the initial cutting line may be constrained at any point on the initial cutting line.

20. The computer-aided design system of claim 18, further comprising instructions to configure the processor to automatically add an additional enhancement to the enhanced initial cutting line to further specify the section view, wherein:
a set of rules applies to adding the additional enhancement; and the set of rules comprises at least one of adding the additional enhancement toward the direction of an outer boundary of the computer-aided design model and adding the additional enhancement only to an outer line segment of the enhanced initial cutting line relative to the outer boundary.

21. The computer-aided design system of claim 18, further comprising instructions to configure the processor to interactively track a point on one of the initial cutting line and the enhanced cutting line based on a cursor movement.

22. The computer-aided design system of claim 18, further comprising instructions to configure the processor to modify one of a size and a position of a line segment of one of the initial cutting line and the enhancement according to a location of the point.

* * * * *